US005653174A

United States Patent [19]
Halus

[11] Patent Number: 5,653,174
[45] Date of Patent: Aug. 5, 1997

[54] COMPUTERIZED ELECTRIC CABLE POWERED/GUIDED AIRCRAFT TRANSPORTATION/POWER/ COMMUNICATION SYSTEM

[76] Inventor: William J. Halus, 5075 E. Crescent Dr., Anaheim Hills, Calif. 92807

[21] Appl. No.: 504,286

[22] Filed: Jul. 20, 1995

[51] Int. Cl.⁶ .................................................. B61B 3/00
[52] U.S. Cl. ......................... 104/124; 104/89; 104/112; 104/281; 104/282; 104/286; 104/292; 105/148; 105/149.1
[58] Field of Search .............................. 104/123, 124, 104/112, 125, 126, 281, 282, 289, 292, 53, 88.02, 88.03, 89, 286; 244/901, 173; 105/148, 149.1

[56] References Cited

U.S. PATENT DOCUMENTS

| | | | |
|---|---|---|---|
| 3,244,113 | 4/1966 | Smyser | 104/112 |
| 3,664,268 | 5/1972 | Lucas et al. | 104/281 |
| 3,774,542 | 11/1973 | Walsh | 104/123 |
| 3,938,445 | 2/1976 | Hughes | 104/124 |
| 4,148,260 | 4/1979 | Minovitch | 104/289 |
| 4,425,851 | 1/1984 | Long | 104/89 |
| 5,289,778 | 3/1994 | Romine | 104/124 |
| 5,465,668 | 11/1995 | Tarassoff et al. | 104/112 |

FOREIGN PATENT DOCUMENTS

| | | | |
|---|---|---|---|
| 193504 | 7/1990 | Japan | 104/281 |
| 5-176413 | 7/1993 | Japan | 104/281 |
| 165117 | 10/1980 | Netherlands | 104/281 |
| 1768422 | 10/1992 | U.S.S.R. | 104/281 |

*Primary Examiner*—Mark T. Le
*Attorney, Agent, or Firm*—Donald W. Meeker

[57] ABSTRACT

Aircraft with full flight capability are connected to structural cables by an electrically powered drive element traveling inside the structural cables. Electricity distribution cables, part of a power distribution grid, connect to the structural cable along its length and provide power to the drive element. A linear series of annular electromagnets in the structural cable encircle a linear array of circular electromagnets in the drive element. A centralized computer controls a constantly changing phase shift in the electromagnets along the structural cable causing the drive element electromagnets to move through the structural cable without contacting the structural cable. The aircraft is connected by cables or rods to the drive elements. Retractable delta wings, an airfoil body, and a controlled angle of attack create lift maintaining the aircraft in flight as the drive element moves through the structural cable. An onboard computer in communication with the central computer controls the drive element electromagnets, the lift creating elements, trim tabs on vertical and horizontal stabilizers, and a number of spoilers to maintain a precise flight path. Fiber optic cables, part of a communication network grid, are attached along the length of the structural cable in communication with an onboard long distance communication system. The structural cables, fiber optic cables, and electricity distribution cables all connect to buildings providing a door-to-door transportation, communication, and nationwide power distribution system. This smart transportation system of the twenty-first century is known as the Aerial SmarTrans (TM). This is the high tech vehicle that will construct and travel the information super highway, thus invigorating and renewing American civilization. It will give the American people great pleasure and pride to pay and ride smart transportation for the next century.

18 Claims, 3 Drawing Sheets

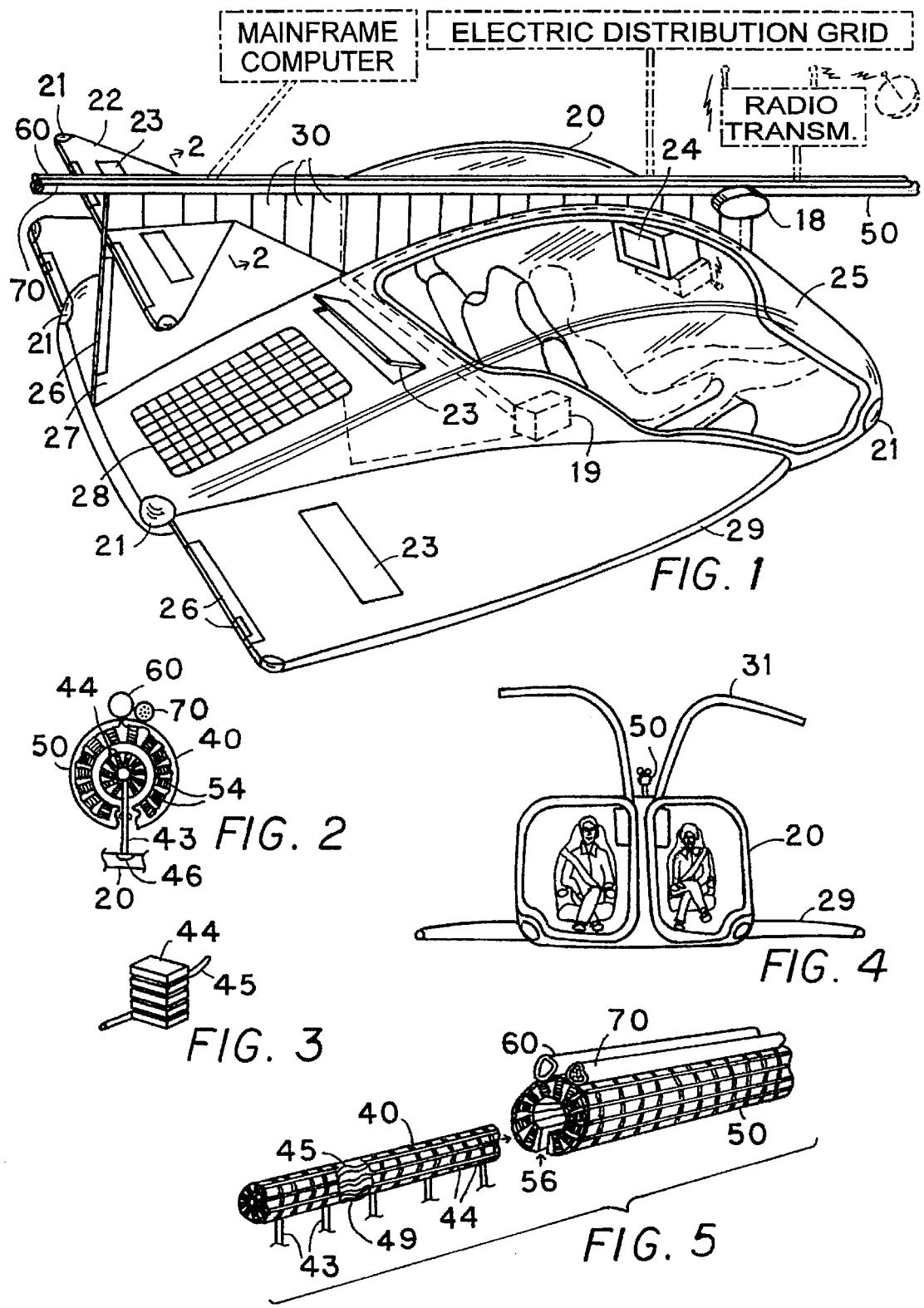

COMPUTERIZED ELECTRIC CABLE POWERED/GUIDED AIRCRAFT TRANSPORTATION/POWER/ COMMUNICATION SYSTEM

BACKGROUND OF THE INVENTION

1. Technical Field

The present invention relates to aircraft transportation systems and in particular to a computer controlled aircraft transportation system with precision flying aircraft connected to electric cables powered by electromagnetic linear motors and maintained in flight and on course by onboard computers and a central system wide computer. Integrated with the system are an electrical cable distribution system interactive with the aircraft for power and a fiber optic cable distribution system interactive with the aircraft for communication.

2. Description of the Prior Art

Integrating the latest technologies into more areas of everyday life improves the quality of life and the ease and efficiency of accomplishing tasks that previously required considerably more time and effort. There is a need for combining the latest technologies in travel, communication, and power distribution into an integrated system providing greater efficiencies of use and eliminating the waste of redundancy between systems.

Transportation needs for speed, efficiency, safety, and pollution control are constantly growing as more and more people travel for business and pleasure. Transportation systems involving control of the vehicles by individuals in the vehicles often result in accidents resulting in deaths and injuries, traffic congestion, and can result in getting lost. Prior art transportation systems consume power and, in some cases create environmental pollution. Prior art power and communication cable distribution systems and transportation systems are separate systems often using parallel but separate power systems.

Most prior art transportation systems rely on human judgment and human reflexes to make decisions related to control of the vehicle operation and direction. Errors in judgment and slow reaction times cause much loss of time in traveling in the wrong direction as well as causing many accidents resulting in loss of lives and properby.

Prior art power grids are separate from communication grids and transportation systems. Opportunities for shared power usage and shared infrastructure are usually not available. Duplication of labor, energy, and materials is costly and wasteful.

Most prior art vehicles utilize built-in drive mechanisms, such as gasoline powered motors and jet engines. The drive mechanisms add considerable weight to the vehicles and create substantial maintenance problems with many moving parts and interactive components. In addition, most prior art land vehicles provide heavy structural components, such as bumpers and heavy frames to protect occupants in the event of a collision. A substantial infrastructure is required to support heavy vehicles by roadways, tracks, and large monorails.

Many prior art vehicles now incorporate at least some computerized controls and are equipped with communication systems such as cellular phones or two-way radios, but the computer and communication equipment is used strictly with the vehicle in traveling, leaving the equipment idle when the vehicle is not in use.

Vehicles having built-in power means consume energy and often create pollution as a by-product, as in the case of vehicles powered by gasoline and diesel engines. Billions of dollars per year are wasted by fossil fuel powered vehicles sitting in congested traffic. The self-powered vehicles are generally extremely heavy because of the power source, wheels and suspension systems, and structure provided in case of a collision, thereby requiring even more power to move the substantial weight. No provision is made for the vehicle to create energy.

DISCLOSURE OF THE INVENTION

The present invention provides an integrated transportation, power, and communication system with computerized control for safe and efficient operation. A single infrastructure of posts and cables supports all three previously separate technologies in a single unified system providing door-to-door transportation together with fiber optic cable and power cable distribution lines to buildings.

Aircraft are attached to a cable system for power and communication utilizing both an onboard computerized navigation control and a centralized system computer for overall system control to provide a safe transportation system elevated above pedestrians and ground obstacles and computer controlled with built-in programmed safeguards against accidental collisions. Fuzzy logic programs the aircraft to maintain a safe distance apart on the cable system with controlled acceleration and deceleration for a safe comfortable ride. Preprogramed destination and route selection saves time by selecting the optimum desired route and prevents getting lost.

Retractable delta wings, a vertical stabilizer tail and rear horizontal stabilizers trim tabs, a number of adjustable spoilers, as well as a streamlined body and adjustable angle of attack, all contribute to the precision flying capability of the aircraft of the present invention. A precision computerized onboard navigational computer, comparable to that of the B-2 bomber, provides instantaneous real-time control means for maintaining the aircraft in flight so that no weight support of the aircraft is required by the cable.

An electromagnetic linear motor formed by a hollow system cable with a series of annular electromagnets inside the cable interacting with a mating series of aircraft-connected annular electromagnets moving within the hollow cable provides a frictionless system with no contact between the cable and aircraft magnets and no moving parts in the system other than the aircraft and their electromagnets. Power for the system cable electromagnets is drawn from an electric cable power grid distribution cable coaxial with the system cable. Acceleration of the aircraft draws electrical energy from the power grid cable and deceleration of the aircraft adds electrical energy to the power grid cable providing energy efficiency with no pollution. High speeds (limited to the speed of sound for environmental reasons) are attainable in the frictionless system enabling much longer trips in a much shorter time than by conventional ground-based transportation, thereby providing the opportunity for spreading out the population over a larger area than the current high density population centers.

Because there are no large onboard motor, no wheels and no need for heavy collision-proof structures, the aircraft are fabricated of lightweight synthetic materials for greater efficiencies in construction and use and providing a lightweight high speed flying aircraft.

Sophisticated onboard navigational computer systems control the flight characteristics of the aircraft precisely to maintain the aircraft in flight so that the cable does not support the aircraft in high-speed flight. Because of the light weight and the fact that the aircraft are flying, a relatively lightweight cable is used for the high-speed portions of the system. At entering and exiting points along the system, heavier cable may be employed to support the aircraft with the cable sloping downwardly to lower the aircraft to ground level at final destination points. Small electric motors adjacent to the cable attached to the aircraft support may propel the aircraft along the cable by drive wheels during entering and exiting if it is desired to eliminate the electric power in the cable adjacent to the ground for safety. Cogs on the cable interact with mating holes in the drive wheels to move the aircraft. Onboard batteries charged by the system power the electric motor. As an alternative or adjunct to sloping system cables, adjustable support lines connecting the aircraft to the system cables may lower and raise the aircraft for ground-level access, by angling the cables or by retracting cables.

Onboard communication systems communicate with fiber optic cables coaxial with the system cable. Radio wave communication between the moving aircraft and the fiber optic cable enables the communication providing a constant communication system.

When the aircraft arrives at its final destination at a home, office or other building, a room there is equipped to receive the aircraft inside the building, so that the aircraft may be used as a computer and communication center in the home, office or other location. The electric cable and fiber optic cable also connect to the building as part of a power grid and communication grid.

Small aircraft designed for one or two people are efficient personal transporters which are suspended from a single cable. Current traffic problems such as traffic jams and car jacking would be eliminated with computer controlled high speed travel off of the ground non-stop from point of origin to point of destination thereby eliminating the wasting of fuel in traffic jams and cutting down on the need for imported oil. Elimination of accidents would lower death and injury rates and result in considerable savings in health care costs. Larger aircraft, including airline size aircraft, are supported on two or more cables and provide transportation for more passengers and cargo. The aircraft may be used in manufacturing and distribution operations to transport goods and people. The high speed of the aircraft and the computerized control enable a substantial number of people to be moved quickly in larger bus-like aircraft as well as many small aircraft. This capability is important in civil defense applications, such as the evacuation of large numbers of people from an area in times of natural and manmade disasters. Military applications of the system include a highly efficient rapid system of transporting troops, equipment, weapons and supplies. The system provides the additional national defense function of a highly efficient and highly controlled ground-based mobile missile transportation system with missiles constantly traveling on larger aircraft over covered cable networks.

Power for the electric cable power grid of the present system is preferably drawn from pollution-free sources. Current technology enables the creation of new power sources. Tunneling underground and through mountains enables water to be channeled from abundant water sources, especially in flood plain regions, to dry regions for irrigation and hydroelectric power by placing power generating turbines in the channel. Creating a trans-basin water diversion provides the elimination of annual devastating floods.

The present invention enables an integration of private and public aircraft so that people can use their own aircraft traveling on the cable network or signal, by a personal radio-controlled signaling device, for an aircraft to pick them up at their specific location, like an automated driverless taxi. The person then enters the aircraft and programs the onboard computer for desired destination and travels on the system for a fee billed through the central computer. After arriving at the desired destination, the person exits the aircraft, which goes back into the system to pick up another passenger.

This smart transportation system of the twenty-first century is known as the Aerial SmarTrans (TM). This is the high tech vehicle that will construct and travel the information super highway, thus invigorating and renewing American civilization. It will give the American people great pleasure and pride to pay and ride smart transportation for the next century.

BRIEF DESCRIPTION OF THE DRAWINGS

These and other details of my invention will be described in connection with the accompanying drawings, which are furnished only by way of illustration and not in limitation of the invention, and in which drawings:

FIG. 1 is a perspective view of the preferred embodiment of a flying aircraft attached to the combined cable system;

FIG. 2 is a cross-sectional view taken through 2—2 of FIG. 1 showing the interior of the cable and the aircraft electromagnets;

FIG. 3 is a perspective view of a single electromagnet;

FIG. 4 is a front elevational view of the preferred embodiment of the invention in a stationary position with the doors open;

FIG. 5 is a partial perspective view of the aircraft electromagnets aligned for insertion in the cable;

BEST MODE FOR CARRYING OUT THE INVENTION

Figure 7:
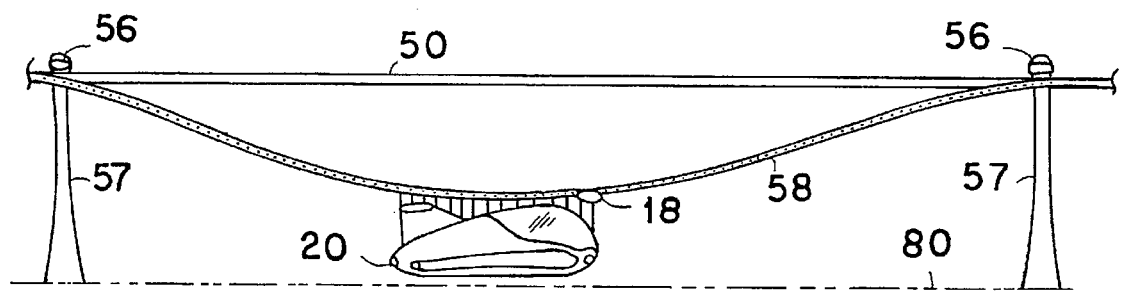
FIG. 7 is a side elevational view of the aircraft in a stationary position on a sloping portion of the cable.

In FIG. 1, a transportation system comprises an aircraft 20 connected to an elongated member, a structural cable 50, extending along a travel route. Spaced vertical supports 57, as seen in FIG. 7 support the cable 50 elevated above ground level 80. The vertical supports 57 may be provided with lights 56 to serve also as street lamps. The structural cable 50 has an means for conducting electricity, an electricity distribution cable 60 attached thereto.

Figure 6:
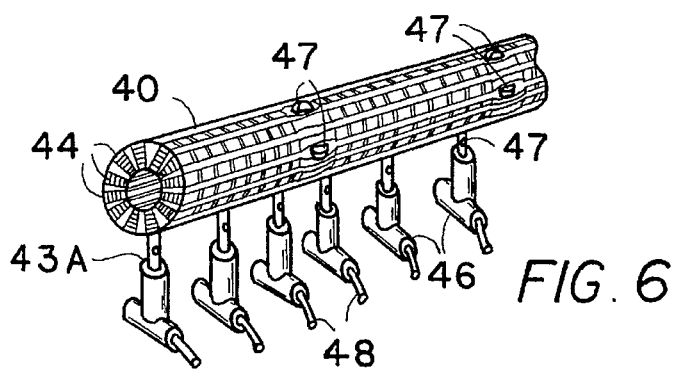
FIG. 6 is an enlarged partial perspective view of the aircraft electromagnets and rods connectable to the aircraft.

The structural cable 50 is provided with a central opening and an interconnected bottom slot 56 along its length. At least one drive element 40, as seen in FIGS. 2, 5 and 6, travels along the structural cable in the central opening. An electrically activated means causes the drive element 40 to travel along the structural cable 50, the electrically activated means drawing electric power from the electricity distribution cable 60. Each drive element 40 comprises at least one linear array of first electromagnets 44 fitting within the central opening. As best seen in FIG. 5, the linear arrays of electromagnets 44 are separated by flexible connecting portions 49, through which pass electric wires 45 which are wound around magnetic cores 44 to form the electromagnets, as seen in FIG. 3. The means for moving the drive elements 40 comprises a series of second electromagnets 54 encircling the central opening along its length and computerized control means for creating a constantly changing phase shift along the second electromagnets 54 electrically connected therewith, so that creating a constantly changing phase shift along the second electromagnets 54 attracts the first electromagnets 44 drawing the first electromagnets 44 along the length of the structural cable. The first electromagnets 44 remain spaced apart from the second electromagnets 54 due to the magnetic field so that a frictionless linear electromagnetic motor is created by the interaction of the first and second electromagnets. A plurality of rolling elements 47, such as wheels and ball bearings, are spaced around each drive element 40 so that the rolling elements will contact the structural cable should the electromagnets fail to space the drive element 40 from the structural cable 50.

Figure 8:
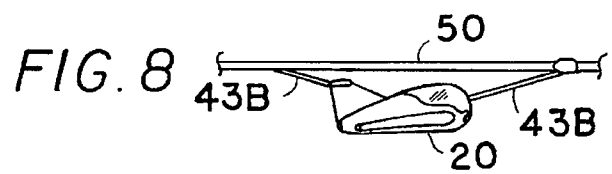
FIG. 8 is a side elevational view of the aircraft in motion suspended by a pair of support cables.
Figure 9:
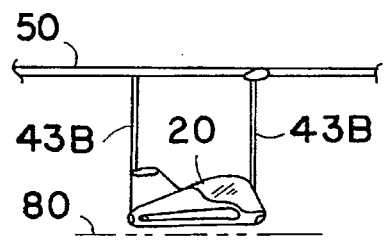
FIG. 9 is a side elevational view of the aircraft in a stationary position suspended by a pair of support cables.

The aircraft 20 is connected to the at least one drive element 40 by a series of elongated supports 43 extending downwardly from the drive elements through the slot 56 (as shown in FIGS. 2 and 5). A one-way pivot 46 connects each elongated support 43 with the aircraft to allow forward pivoting of the elongated support as the aircraft 20 accelerates and backward pivoting as the aircraft decelerates. In FIG. 6, each elongated support 43A comprises a telescoping shock absorber. Wires 48 for conducting electricity extend through the elongated support to the aircraft. In FIGS. 8 and 9, the elongated support comprises support cables 43B which can be angled in various orientations, so that the aircraft 20 can be raised toward and lowered away from the horizontal structural cable 50. FIG. 8 shows the aircraft 20 in flight with the support cables 43B sharply angled maintaining the aircraft 20 in flight up near the structural cable 50. FIG. 9 shows the aircraft in a stationary position with the support cables 43B in a straight vertical orientation maintaining the aircraft 20 in a lowered position near the ground level 80. Another way to vary the height of the aircraft 20 is using variably extensible cables which roll onto rollers (not shown) inside the aircraft to change the exposed length of cable.

The aircraft 20 is equipped with complete means for flying including means for creating lift, at least one horizontal stabilizer 27, at least one vertical stabilizer 22, a plurality of trim tabs 26, and a plurality of spoilers 23 extending from the aircraft and the computerized controlling means (computer monitor 24 shown in FIG. 1) is programmed to operate as a fly-by-wire autopilot, controlling the drive element electromagnets 44 and the other flying means, maintaining the aircraft in a precise flight pattern out of contact with the structural cable 50. The aircraft 20 is held in flight by movement of the drive element 40 along the structural cable 50. By maintaining the aircraft in flight, the weight of the aircraft 20 is not supported by the structural cable 50 so that the structural cable can be a relatively thin cable along the flight route. The means for creating lift comprises retractable delta wings 29 reversibly extensible from two opposing sides of the aircraft, an airfoil contour of the aircraft so that the aircraft creates lift, and computerized means for changing the angle of attack of the aircraft to create additional lift. Overlapping panels 30 may be mounted over the elongated supports 43 to create an additional horizontal stabilizer.

Figure 10:
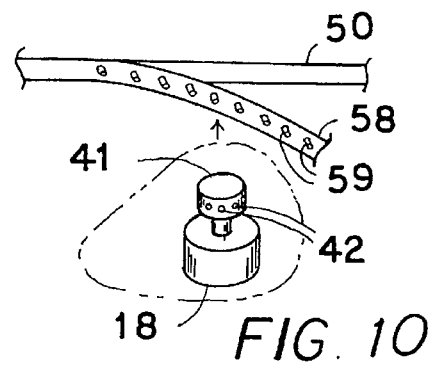
FIG. 10 is a partial perspective view of the electric motor auxiliary drive of the aircraft aligned with a branch of the cable.

In FIGS. 7 and 10, an auxiliary electric motor 18 connected to the side of one drive element, has a mechanical means in the form of a rotatable wheel 41 for moving the drive element 40 along the structural cable 50. Holes 42 regularly spaced around the perimeter of the wheel 41 interact with pegs 59 protruding from a branch 58 of the structural cable. A battery 19 in the aircraft 20 powers the electric motor, and a means for recharging the battery connects to the wires 48 (in FIG. 6). Solar panels 28 on the aircraft provide additional means for charging the battery.

Access and egress branch cables 58 connect with the structural cable 50, the branch cables being stronger than the structural cable for supporting the aircraft hanging from the branch cables, the branch cables sloping to position the aircraft at ground level for loading and unloading the aircraft 20. The mechanical means for moving the at least one drive element engages the branch cables to move the aircraft along the branch cables slowing to a stop on the egress branch cables and accelerating from stop up to flying speed on the access branch cables.

In FIGS. 2 and 5, an electricity distribution cable 60 is attached to the structural cable 50 along its length. The electric distribution cable 60 connects into an electricity distribution grid (as in FIG. 1) so that acceleration of the aircraft draws electric power from the electricity distribution grid and deceleration of the aircraft adds electric power to the electricity distribution grid, changing the linear motor to a linear generator.

A fiber optic cable 70 is attached to the structural cable 50 along its length and a telephonic and computer networking means for long distance digital audiovisual communicating having a radio wave transmitter and receiver are positioned within the aircraft, so that the means for long distance communicating interacts with the fiber optic cable by radio waves, the fiber optic cable 70 connected to a communication grid.

Figure 12:
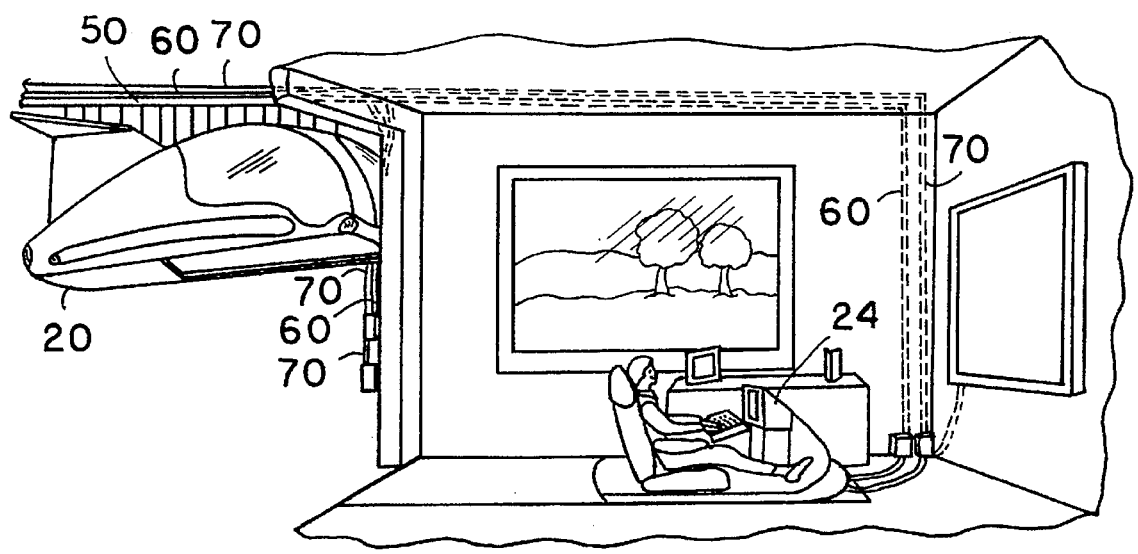
FIG. 12 is a side elevational view of the aircraft parked in a room of a building for use as a communication and computer networking work station.

The fiber optic cable 70 and the electric distribution cable 60 both connect to buildings as part of a digital audiovisual communications and power distribution networks. In FIG. 12, the aircraft 20 is configured to fit within a room in a building, the computerized means for controlling the flying means is programmed to be usable within the room in the building for other uses, and the means for long distance communicating is configured to be usable within the room in the building. The aircraft 20 when parked within the room becomes a communication and computer network work station. For the purpose of aesthetics, the vehicle's outer body, including the delta wings, can be detached from the platform containing the seats, the computer, and the communication equipment, before the platform enters the building's communication center.

A central mainframe super computer electrically interconnects with the means for creating a constantly changing phase shift along the second electromagnets and electrically interconnects with the computerized means for controlling the flying means, so that movement of a number of aircraft along the structural cable 50 is controlled by the central computer and the computerized means for controlling the flying means can communicate routing information between the aircraft and the central computer. The aircraft is controllable by the central computer and is able to carry cargo only with no passengers on board. The system may be used as a ground-based mobile missile transportation system with a plurality of aircraft constantly moving on a plurality of structural cables carrying defense ground-to-air missiles 95 (as in FIG. 11).

Figure 11:
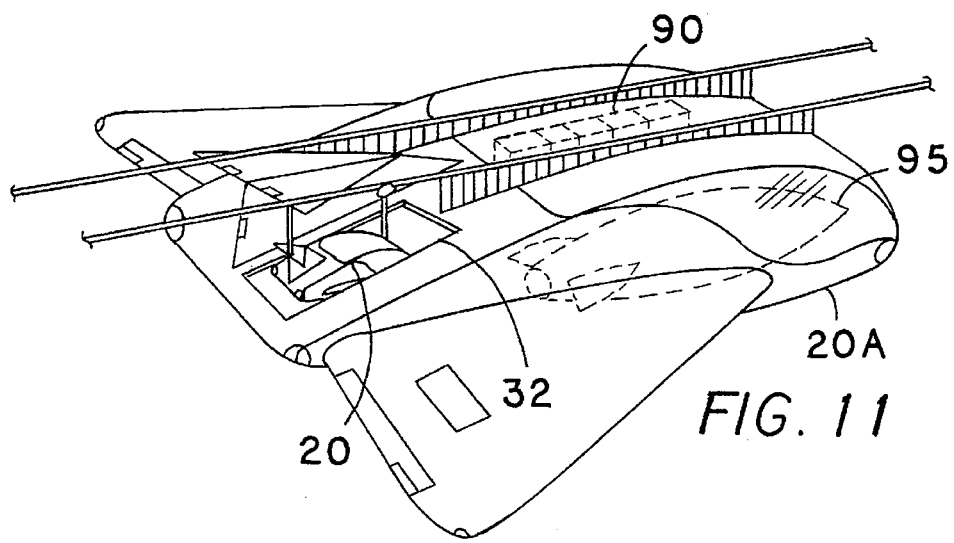
FIG. 11 is a perspective view of a wide-bodied aircraft connected to two structural cables with a smaller aircraft connected to a single structural cable docked in the wide-bodied aircraft.

In FIG. 11, two or more cables 50 spaced apart and parallel to one another so that a wide-bodied aircraft 20A is connected to both structural cables by drive elements 43 so that the wide-bodied aircraft is capable of carrying a heavy cargo of people and/or goods 90. The wide-bodied aircraft 20A has a means for docking 32 so that a small aircraft 20 traveling along a single structural cable 50 may dock with the wide-bodied aircraft 20A.

The aircraft is fabricated of lightweight synthetic structural material. A great deal of the cabin of the aircraft is covered with polarized panels 25 for light control inside the aircraft. The doors 31 wing upwardly out of the way (see FIG. 4) for easy access and egress. Lights 21 are positioned on the outside of the aircraft 20 for running lights and viewing the surroundings in the dark. The structural cables 50 and drive elements 40 are coated with weatherproofing material.

It is understood that the preceding description is given merely by way of illustration and not in limitation of the invention and that various modifications may be made thereto without departing from the spirit of the invention as claimed.

What is claimed is:

1. A transportation system comprising:
an elongated member, having means for conducting electricity, extending along a travel route;
means for supporting the elongated member above ground level;
at least one drive element which travels along the elongated member;
an electrically activated means for causing the at least one drive element to travel along the elongated member, which electrically activated means draws electric power from the means for conducting electricity;
an aircraft connected to the at least one drive element, the aircraft having means for flying, the aircraft held in flight by movement of the at least one drive element along the elongated member;
a computerized means for controlling the flying means;
wherein the means for flying comprises means for creating lift, at least one horizontal stabilizer, at least one vertical stabilizer, a plurality of trim, and a plurality of spoilers extending from the aircraft and the computerized controlling means is programmed to operate as a fly-by-wire autopilot, controlling the drive element and the means for flying maintaining the aircraft in a precise flight pattern out of contact with the elongated member;
wherein the elongated member comprises a structural cable having a central opening and an interconnected bottom slot through the elongated member along its length, the at least one drive element comprises at least one linear array of first electromagnets fitting within the central opening, and the means for moving the at least one drive element comprises a series of second electromagnets encircling the central opening along its length and means for creating a constantly changing phase shift along the second electromagnets electrically connected therewith, so that creating a constantly changing phase shift along the second electromagnets attracts the first electromagnets drawing the first electromagnets along the length of the structural cable, the first electromagnets remaining spaced apart from the second electromagnets so that a linear electromagnetic motor/generator is created by the interaction of the first and second electromagnets.

2. The transportation system of claim 1 wherein the means for creating lift comprises retractable delta wings reversibly extensible from two opposing sides of the aircraft.

3. The transportation system of claim 2 wherein the means for creating lift further comprises an airfoil contour of the aircraft so that the aircraft creates lift.

4. The transportation system of claim 3 wherein the means for creating lift further comprises means for changing the angle of attack of the aircraft to create lift.

5. The transportation system of claim 1 wherein the at least one drive element further comprises an elongated support extending from each of the at least one linear arrays of first electromagnets through the slot interconnecting the at least one drive element with the aircraft and the elongated support further comprises at least one wire for conducting electricity from the drive element to the aircraft.

6. The transportation system of claim 5 wherein the elongated support comprises a support cable adjustable in length, so that the aircraft can be raised and lowered from the horizontal structural cable.

7. The transportation system of claim 1 wherein the means for conducting electricity comprises an electricity distribution cable attached to the structural cable along its length, the electric distribution cable connected into an electricity distribution grid so that acceleration of the aircraft draws electric power from the electricity distribution grid and deceleration of the aircraft adds electric power to the electricity distribution grid, creating highly efficient use of energy.

8. The transportation system of claim 7 further comprising a fiber optic cable attached to the structural cable along its length and means for long distance digital audiovisual communicating having a radio wave transmitter and receiver within the aircraft, so that the means for long distance communicating interacts with the fiber optic cable by radio waves, the fiber optic cable connected via satellites to a global digital audiovisual communication grid.

9. The transportation system of claim 8 wherein the fiber optic cable and the electric distribution cable both connect to a building, the aircraft is configured to fit within a room in the building, the computerized means for controlling the flying means is programmed to be usable within the room in the building for other uses, and the means for long distance digital audiovisual communicating is configured to be usable within the room in the building.

10. The transportation system of claim 1 further comprising a central mainframe super computer electrically interconnected with the means for creating a constantly changing phase shift along the second electromagnets and electrically interconnected with the computerized means for controlling the flying means, so that movement of a number of aircraft along the structural cable is controlled by the central mainframe super computer and the computerized means for controlling the flying means can communicate routing information between the aircraft and the central computer.

11. The transportation system of claim 10 wherein the aircraft is controlled by the central computer and carries only cargo.

12. The transportation system of claim 11 wherein a plurality of aircraft are constantly moving on a plurality of structural cables, the plurality of aircraft carrying missiles, thereby creating an instant response ground-based mobile missile transportation system.

13. The transportation system of claim 1 further comprising an auxiliary electric motor connected to the at least one drive element having mechanical means for moving the at least one drive element along the structural cable, a battery in the aircraft for powering the electric motor, and a means for recharging the battery.

14. The transportation system of claim 13 further comprising access and egress branch cables connected with the structural cable, the branch cables being stronger than the structural cable for supporting the aircraft hanging from the branch cables, the branch cables sloping to position the aircraft at ground level for loading and unloading the aircraft so that the mechanical means for moving the at least one drive element engages the branch cables to move the aircraft along the branch cables slowing to a stop on the egress branch cables and accelerating from stop to flying speed on the access branch cable.

15. The transportation system of claim 13 further comprising solar panels on the aircraft for charging the battery.

16. The transportation system of claim 1 further comprising at least one additional structural cable separated from and parallel to the structural cable so that a wide-bodied aircraft is connected to both structural cables by the at least one drive element to each structural cable so that the wide-bodied aircraft is capable of carrying heavy cargo, and the wide-bodied aircraft has a means for docking so that the aircraft traveling along a single structural cable may dock with the wide-bodied aircraft, while at full speed for loading and unloading individual passengers for selected destinations.

17. The transportation system of claim 1 wherein the means for supporting the structural cable comprises a series of vertical posts in the ground having means for supporting the structural cable along the top of the structural cable.

18. The transportation system of claim 1 wherein the at least one drive element further comprises a plurality of rolling means spaced around the at least one drive element so that the rolling means will contact the structural cable should the electromagnets fail to space the at least one drive element from the structural cable.

* * * * *